Figure 1:
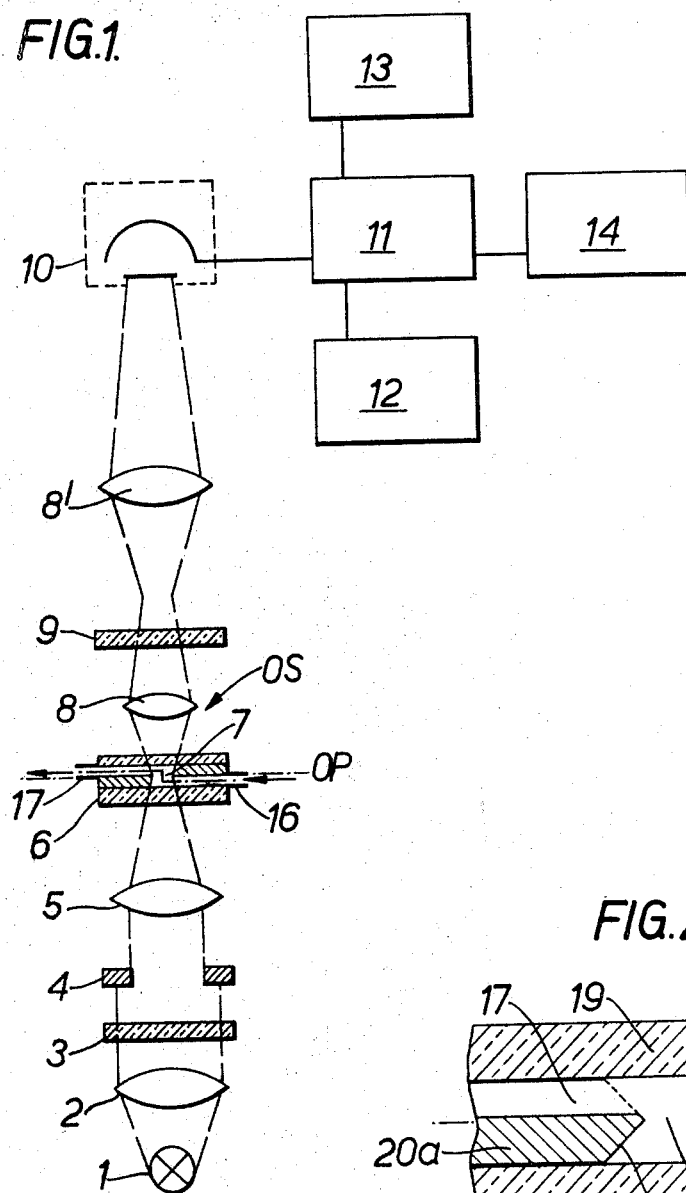

United States Patent [19]
Dittrich et al.

[11] 3,761,187
[45] Sept. 25, 1973

[54] FLOW-THROUGH CHAMBER FOR PHOTOMETERS TO MEASURE AND COUNT PARTICLES IN A DISPERSION MEDIUM

[76] Inventors: Wolfgang M. Dittrich, Am Krug 42; Wolfgang H. Göhde, Lohoefenerweg 39, both of Muenster, Germany

[22] Filed: Dec. 23, 1971

[21] Appl. No.: 211,798

Related U.S. Application Data

[62] Division of Ser. No. 884,651, Dec. 12, 1969, abandoned.

[30] Foreign Application Priority Data

Dec. 18, 1968  Germany................. P 18 15 352.1

[52] U.S. Cl................................. 356/246, 250/218
[51] Int. Cl. ........................................... G01n 1/10
[58] Field of Search................ 356/244, 245, 246, 356/96, 97, 51; 250/435 R, 218

[56] References Cited
UNITED STATES PATENTS

| 3,079,505 | 2/1963 | Weir et al. | 356/244 |
| 3,307,447 | 3/1967 | Carleton et al. | 356/246 |
| 3,515,491 | 6/1970 | Emary | 356/246 |
| 3,614,243 | 10/1971 | Harvey | 356/246 |

*Primary Examiner*—William L. Sikes
*Attorney*—D. C. Roylance, David S. Abrams, Robert H. Berdo, Donald A. Kaul and Walter C. Farley

[57] ABSTRACT

A particle measuring and counting device comprises a flow-through chamber having a conduit for the dispersion medium. The central vertical nozzle of the conduit is disposed with its opening in the sharply focussed object plane of a microscope and uniformly illuminated from below or by incident illumination. Electronic counting and recording devices are coupled to the output of the microscope for analyzing light pulses occuring in the nozzle when particles pass therethrough.

8 Claims, 2 Drawing Figures

WOLFGANG DITTRICH
WOLFGANG GÖHDE
INVENTOR

BY
Nolte & Nolte.
ATTORNEY

FLOW-THROUGH CHAMBER FOR PHOTOMETERS TO MEASURE AND COUNT PARTICLES IN A DISPERSION MEDIUM

This application is a division of U.S. application Ser. No. 884,651, filed Dec. 12, 1969, now abandoned.

The present invention relates to automatic measuring and counting devices and, more particularly, to devices for selectively counting, measuring and classifying particles in a dispersion medium flowing across an optical path of light rays, with a substantial component of velocity parallel to the axis whereby various optical behavior of the particles is caused by different physical, physical-chemical or chemical properties of these particles.

Automatic measuring and counting devices for dispersed particles are employed in the science and technology mostly for the purpose that a quantity of minute particles such as, for example, dust particles, crystals, bacteriae, algae, planktons, grease droplets, and the like, could be numberically evaluated and classified according to their size. By contrast to the direct non-automatic or automatic counting of the particles in a solid microscopic speciment, an automatic measuring and counting flow-through method makes it possible to determine quickly and accurately the amount and, under certain presumptions, also the relative size of particles contained in a predetermined volume of a fluid or gaseous dispersion medium.

From the prior art, for instance, in German Pat. No. 964,810, automatic flow-through measuring and counting devices are known which enable the determination in addition to the number of the particles in a large group thereof also, at least approximately, their relative size. Such prior art devices are based on the phenomenon that particles in a dispersion medium, when flowing through a narrow passage upon which a d.c. voltage is applied, will induce variations in the resistance of the flowing medium. These variations can be amplified and counted as electric pulses. Besides, the resistance variations increase proportionally to the size of the particles. As a consequence it is possible to evaluate, in large groups of the particles, the distribution of their relative sizes.

In such an automatic measuring and counting method, the particles are suspended in an electrolytic solution and when passing through an aperture which is provided as an electrically conductive conduit between two vessels filled with the electrolytic solution, resistance variations will occur. These variations make it possible, with equal specific inner conductivity of the particles, to classify the same according to their size. Due to the fact that the magnitudes of the resistance variations depend both on the volume of respective particles, and on their inner conductivity, the latter method for determination of sizes of the particles yields, however, only very inaccurate results. Moreover, this method fails to take into account additional features of the particles which, besides the volume and inner conductivity, may be employed for the classification or for a better description of the particles.

Accordingly the primary object of the present invention is to provide an automatically operating apparatus which, in addition to the determination of the total amount and the size distribution of the particles in a predetermined volume of a fluid or gaseous dispersion medium, enables the classification which is based on various additional physical, physical-chemical or chemical qualities of the counted particles.

More particularly, it is an object of the present invention to avoid the cumbersome classification of particles by the aid of microscopic or micro-spectophotometric analysis of a multitude of individual particles in counting chambers or microscopic smear preparations.

The main object of the present invention therefore is to replace the prior art devices for the aforementioned analysis, such as, for example, type UMSP-1 Universal Micro-Spectrophotometer of the firm C. Zeiss, by an automatically registrating through-flow measuring device which within a very short time can process a large number of particles.

A further object of the present invention is to provide a device which can be modified into a great variety of types for measuring various qualities of the particles such as absorption properties, refraction of light from the particles at different wave lengths, the light dissipation produced by the particles when employing darkfield illumination, and the intensity of fluorescent light after fluorchrome dyeing of the particles with specific fluorescent or phosphorescent dyes. In the latter case provisions are made for ascertaining the quantity of a single substance or, at the same time, of a number of substances contained in a single particle.

According to the present invention, the aforementioned objects are attained by providing a nozzle disposing the vertical central portion of the conduit into the sharply focussed object plane of a microscope, substantially in alignment with the optical axis of the latter, feeding with a high speed the dispersion fluid containing the particles to be counted and measured, through the nozzle. Due to the mechanical pressure difference resulting in the stepped sides of the nozzle the fluid is moved substantially in the direction of the optical axis of the microscope. It is essential for the proper operation of the device that the aperture of the nozzle and the passing particles therein be uniformly illuminated and that each particle be accurately guided to appear only once in the sharply focussed object plane of the microscope.

The above features cannot be attained in prior art devices where the particles with their dispersion medium are moved transversally to the direction of observation of the microscope through a capillary tube that is only partially intersected by the focussing plane of the microscope in its visual field. It is true that such shortcoming can be avoided by the employment of microobjectives having an increased depth of field, nevertheless a considerable loss in sensitivity must be tolerated since the objectives having apertures with extremely high numerals could no longer be applied. By contrast, if the particles are moved through a small aperture of a nozzle disposed with its plane of aperture perpendicular to the optical axis of the microscope, then each particle appears a single time and for only a single instant at the optimum optic position for measuring. Due to uniform illumination of the nozzle aperture, each particle transmits or releases at a given time point an optical signal which is characteristic for this particle. Because of the discrete variations in the light stream, corresponding to the passage of particles through the above described uniformly illuminated aperture of the nozzle in a sharply focussed object plane of a microscope, it becomes possible to ascertain not only the number of particles in a pre-determined volume of the dispersion fluid, but also information about other physical, physico-chemical or chemical properties of the particles. For instance, the size of particles can be determined with the aid of so called phase contrast optics in a bright field process, provided however, that the variations of the light stream are dependent in a known manner on the size of the particles. The size determination can also be accomplished by means of a dark-field process. Each particle in dependency of its size reflects or scatters a larger or smaller amount of dissipated light on a light sensitive receiver (e.g., a photomultiplier). The optical information is utilized for the determination of other properties of the particles, such as absorption at different wave lengths, reflection of light, excitability with regard to the fluorescence or phosphorescence of the particles or of material components thereof. These properties, according to a known law, are dependent on optical phenomena of illuminated particles.

In particular, by providing a nozzle aperture which is disposed in the focal or object plane of a microscope, a uniform spatial angle of the fluorescent or phosphorescent light is insured at the passing of the particles through the aperture. Consequently, the particles can be simultaneously sharply focussed and uniformly illuminated by the luminous field diaphragm in the vertical central portion of the conduit (the nozzle) and classified according to the maximum amplitude of the fluorescent or phosphorescent signal, provided that the particles contain fluorescent or phosphorescent substances or are stained with fluorescent dyes.

Each variation in the light stream caused by the flow of respective particles through the nozzle, that is an increase or decrease of the light stream, is converted into a corresponding electric pulse, with the aid of a microscope and photomultiplier, for example. The pulses are fed to an amplifier and recorded in a recording device. The particle density in the dispersion fluid can be made as low as to reduce nearly completely a simultaneous registration of several particles. After the predetermined measured volume of fluid has passed through the nozzle of the flow chamber, it is possible, in the simplest way, to determine, by the aid of a multichannel analyzer, both the total number as well as the size distribution of the registered pulses and, consequently, the abundance rate or distribution of the particles characterized by the heights of corresponding pulses. Provisionally, it is also possible to obtain the abundance distribution of particles by the application of a variable electronic discrimination threshold.

It is possible to develop any modifications of this measuring and counting principle to solve any special measuring problem. Phosphorescent or fluorescent particles can be counted in bright field; the size determination is hereby possible in a very simple manner provided that the intensity of fluorescence is proportional to the size of the particles.

Microchemical experiments with particles in a suspension or emulsion are possible when certain parts of the particles are fluoro-chromed and thus made selectively excitable for fluorescence or phosphorescence.

All of the above mentioned selective measuring and counting methods necessitate a uniform illumination of the portion of the nozzle aperture that is positioned in the sharply focussed object plane of a microscope as well as of the particles passing therethrough.

To eliminate disturbing effects, especially when applying the bright-field illumination, it is necessary that the radiant field stop or diaphragm of the microscope might be mapped optically in the object plane according to the so called Kohler's illumination principle, in such a manner as to project a light spot having the size and coinciding with the aperture of the nozzle. The illumination density is thereby maximum in the object plane of the microscope.

If mere counting of the particles is required, the application of the dark-field illumination is suitable for the microscope; especially the particles having the size in the range of the wave lengths of visible light and releasing, when passing through the nozzle aperture, light pulses resulting from the Tyndall scattering effect, are suitable for the dark field application. The light pulses subsequently go through the microscope to the photomultiplier.

If the interdependence of the scattered light in a dark field and the particle size is known, the latter method is suitable also for the measurement of particle sizes.

If the particles in a dispersion contain one or more fluorescent substances with different fluorescent spectra, it is possible to direct the fluorescent light via optical divider plates simultaneously to two or more photomultipliers which, by means of attached light filters, are made sensitive to fluorescent light of only a single fluorescent substance.

The recording of the electric pulses from the two or more photomultipliers is made via one-, two- or multiparameter pulse height analyzers.

Figure 2:
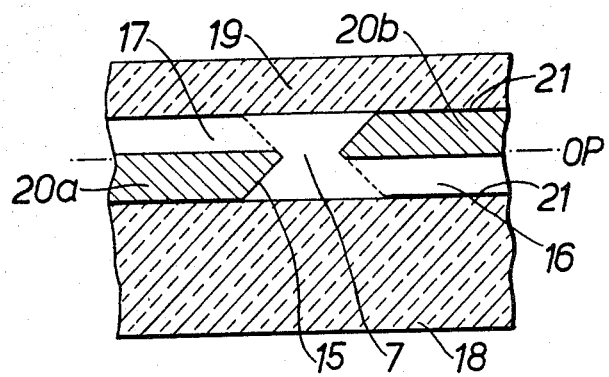

The invention is illustrated by way of example in the attached drawing, in which:

FIG. 1 is a schematic view of the entire device according to this invention, and FIG. 2 shows on larger scale a cross-sectional view of the central portion of the flow-through chamber for the measuring and counting device as shown in FIG. 1.

Referring now to FIG. 1 of the drawing, there is schematically shown an embodiment of the device according to the present invention modified for the counting of fluorescent particles in a dispersion medium and for measuring the intensity of fluorescent phenomena thereupon.

The device comprises a compound optical system having, consecutively arranged along an optical axis, a soruce 1 of constant light, a collector lens 2, an exciter light filter 3, an adjustable radiant field stop or diaphragm 4, a condenser lens 5, a transparent flow-through chamber 6, a microscope set 8 and 8' and an exciter light stop filter 9. The flow-through chamber 6 which will be discussed in more detail below with reference to FIG. 2, is located in the object, plane OP of the microscope 8 and 8' in such a manner that the narrowest part of the central vertical channel or the nozzle opening 7 in the flow-through conduit 16, 7 and 17 of the chamber 6 coincides with the objective focal plane OP. The radiant field stop 4 is optically mapped sharply in the specimen plane. Condensed and filtered light passes from source 1 over the entire area of the nozzle opening 7 so that the latter according to the so-called Kohler principle is uniformly illuminated. The light reflected, scattered or emitted by fluorescence by particles entering the conduit 16, 7, 17 pass through the nozzle opening 7 in the object, plane OP. The emitted discrete fluorescent light pulses are separated from the exciter light in the exciter light filter 9 and projected through eye-piece lens 8' to the input of a photomultiplier 10. The corresponding electric pulses resulting at the output of the photomultiplier 10 are, in a known manner, amplified in an amplifier 11, counted in a counter 12, visually checked by means of a cathode ray tube 13 and, finally, with the aid of a pulse height analyzer 14, it is possible to classify respective pulses according to their heights and thereby the distribution of the intensity of the fluorescent light can be determined. In the case when the particle density is to be recorded, a manometer system, a suction device or other direct or indirect volume controlling devices, such as a ratemeter with a constant speed of the flow-through, are operatively adapted to the device of the present invention to control the number of the particles in a volume unit.

With reference to FIG. 2, the flow-through chamber 6 of FIG. 1 is illustrated in a vertical cross-sectional view.

In order to employ Köhler's illumination principle and to attain the required high light density in the object plane OP, it is necessary that the nozzle plate 20 with input or output channel 16 and output or input channel 17 forms a frusto-conical passage 15 tapering towards the nozzle opening 7. To insure that the measured particles instantly pass through the measurement area in the object plane OP which exactly coincides with the circular nozzle opening 7, it is necessary that the particles be fed to the nozzle opening 7 through a very flat inlet channel 16, and discharged through a correspondingly flat outlet channel 17 of the flow-through conduit 16, 7, 17. The diameter of the circular nozzle opening 7 can vary according to the size of particles to be counted and measured from several microns to several hundred microns. The base plate 18 and top plate 19 of the chamber 6 must be made of transparent material to pass the exciter light as well as the emitted light pulses.

The vertical distance between the plates 18 and 19 must be as low as possible to insure that the volume illuminated by light from source 1 be small and, consequently, that coincident measuring of particles be avoided.

It is possible to manufacture glass capillary flow-through tubes of the aforementioned configurations wherein the distance between the bottom plate 18 and the top plate 19 is approximately 100μ. The nozzle plate 20 is mounted to plates 18 and 19 by adhesion. Furthermore, it is possible to make the nozzle plate of a corrosion resistive metal, thereby providing an ideal diaphragm in the object plane OP. The height of the entire flow-through chamber 6 should not exceed 1 mm in order that the Köhler's principle and the immersion in oil might be accomplished.

By contrast to other automatic measuring and countint devices of this type the device according to the present invention has the advantage that it enables accurate measurement of optical qualities of particles in a dispersion medium.

For example, by means of the device of this invention it becomes possible for the first time to automatically determine with great accuracy and speed the amount of fluorescent substance components in extremely large sets of the particles. Due to the fact that the particles move for a short period in the direction of the optical axis and the nozzle opening coincides with the sharply focussed object plane of the microscope, the light pulse for the input of the photomultiplier attains its maximum at the instant only when the fluorescent particle passes through that nozzle opening. Besides, since the nozzle opening 7 is uniformly illuminated, the light pulse intensity is independent of site of passage of individual particles in the narrow area of the nozzle opening 7. A satisfactory measurement of optical properties of particles in flow was never attainable in simple capillary tubes arranged perpendicularly to the observation axis of the microscope.

A further essential advantage of the device of the present invention resides in the fact that it employs relatively large diameter of the nozzle opening which cannot be easily clogged. The upper limit of the size of the nozzle opening is determined by the size of the field of view of the microscope and is still applicable for particles having considerably smaller cross-sections.

When employing the pulse conducto-metering method for the determination of the amount and size of particles, it has been necessary for particles having different sizes to employ correspondingly different capillary tubes. Especially in counting and measuring extremely small particles, there occurred, due to the necessity of frequent removal of the capillary tubes, difficulties which are almost insuperable in prior art devices.

In another modification, the device of the present invention is provided with two or more photomultipliers operatively connected with multiparameter pulse height analyzers. This arrangement enables simultaneous measurement of a number of fluorescent substances contained in the same particle, and to evaluate quantitatively the ratios contained those substances. For instance, if the "particle" is a biological material suspended in water, such as nucleous single-cells having nuceous and cytoplasm selectively dyed prior to the measurement with various fluoro-chrome dyes, the above described arrangement for simultaneous measurement of fluorescent light mixture emitted from each cell makes it possible to analyze quantitatively the fluorchromed substances in the cell nucleous and cytoplasm of each individual cell in an arbitrarily large accumulation of those cells; the measurement is carried out by means of at least two photomultipliers whereby respective photomultipliers are responsive to the fluorescent light of one of the flurochrome dyes. The prior art pulse conductometric method does not allow differenciated recording of the above described kind. The novel device of the present invention is far superior in speed to conventional cytophotometers, such as to the Universal Micro-Spectro-Photometer type UMSP I.

This invention provides, by contrast to known measuring and counting systems, the further advantage in that a single measurement set automatically ascertains in an extremely large group of particles processed not only the number of the particles in a predetermined volume of a liquid or gaseous dispersion medium, but also the relative abundance of particles with regard to their physical, physio-chemical or chemical properties.

The submicroscopic particles are thereby automatically counted by the application of the Tyndall-effect. Furthermore, the abundancy rate in large groups of the particles is recorded and classified according to the contents of various substances such as, for example, chlorophyll, nucleous acids, proteins and other substances absorbing light of definite wavelength or having fluorescent properties, with or without the employment of absorbing or fluorescent dyes.

What is claimed is:

1. A flow-through chamber for photometric measurement and counting of particles in a dispersion medium, comprising:
   a transparent top plate;
   a base plate in parallel spaced relation to said top plate;
   means, located between said plates, for defining, in conjunction with said plates, inlet and outlet channels having a first axis and second axis, respectively;
   said first and second axes lying in planes which are in parallel spaced relationship;
   means for defining a passage for connecting adjacent ends of said channels;
   said passage having an axis perpendicular to said first and second axes and having a reduced diameter midportion including a nozzle having a circular cross-section.

2. A flow-through chamber according to claim 1, wherein said means for defining said inlet and outlet channels includes an intermediate plate located between and parallel to said top and base plates.

3. A flow-through chamber according to claim 1, wherein said means for defining a passage includes means defining first and second frusto-conical portions coinciding at and converging to said nozzle.

4. A flow-through chamber according to claim 1, wherein said nozzle is located in a plane parallel to said first and second axes.

5. A flow-through chamber according to claim 1, wherein said base plate is transparent.

6. A flow-through chamber according to claim 1, wherein said means for defining a passage includes an intermediate plate located between and parallel to said top and base plates.

7. A flow-through chamber according to claim 1, wherein the sum of the dimensions of said first and second channels in the direction perpendicular to said first and second axes is approximately equal to the spacing between said top and base plates.

8. A flow-through chamber, for use with photometers having an optical axis to measure and count particles in a dispersion medium flowing through said chamber, comprising:
   a transparent top plate;
   a base plate in parallel spaced relation to said top plate;
   means, located between said plates, for defining in conjunction with said plates inlet and outlet channels having a first axis and second axis, respectively;
   said first and second axes lying in planes which are in parallel spaced relationship with each other and with said top and base plates;
   means for defining a passage for connecting adjacent ends of said channels;
   said passage having an axis perpendicualr to said first and second axes and parallel to said optical axis of said photometer, and having a reduced diameter midportion including a nozzle having a circular cross-section.

* * * * *